No. 894,179. PATENTED JULY 28, 1908.
J. G. BINS.
DOOR SECURER.
APPLICATION FILED MAR. 16, 1908.

Witnesses
M. E. Fowler
James R. Mansfield

Inventor
John G. Bins.
By Alexander Lowell Attorneys

UNITED STATES PATENT OFFICE.

JOHN G. BINS, OF HARRISON, MONTANA.

DOOR-SECURER.

No. 894,179.   Specification of Letters Patent.   Patented July 28, 1908.

Application filed March 16, 1908. Serial No. 421,387.

*To all whom it may concern:*

Be it known that I, JOHN G. BINS, of Harrison, in the county of Madison and State of Montana, have invented certain new and useful Improvements in Door-Securers; and I hereby declare that the following is a full, clear, and exact description thereof, reference being had to the accompanying drawings, which form part of this specification.

This invention is an improvement in devices for fastening doors and the like from the inside, and is especially adapted for use by travelers who may desire to additionally secure the doors of the rooms which they occupy.

The object of the present invention is to provide an efficient device of this nature which can be readily applied to a door and will securely fasten the same, and can be compactly closed when not in use, and conveniently carried in the pocket or grip.

The invention consists in the novel construction of securer, as hereinafter described and claimed, and the accompanying drawings illustrate a device embodying the invention.

Figure 1:
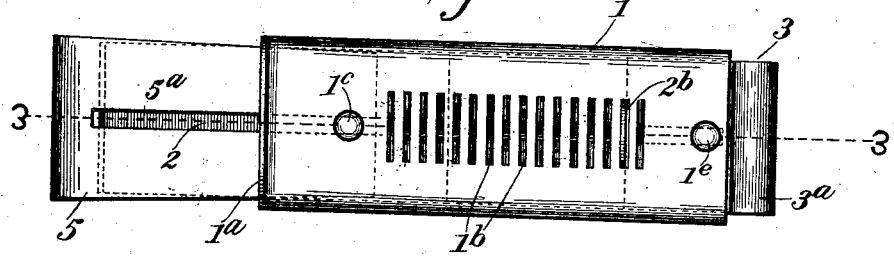
Figure 2:
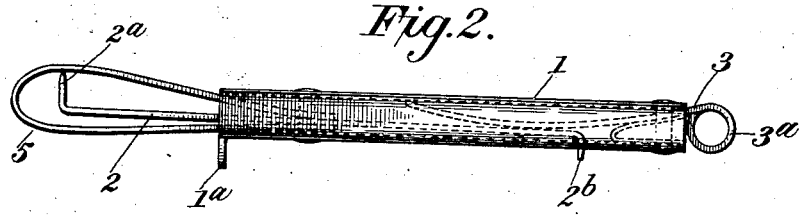
Figure 3:
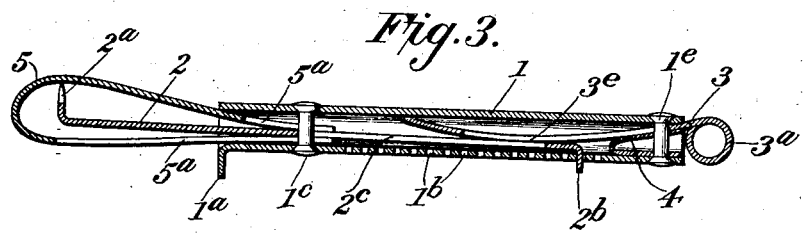
Figure 4:
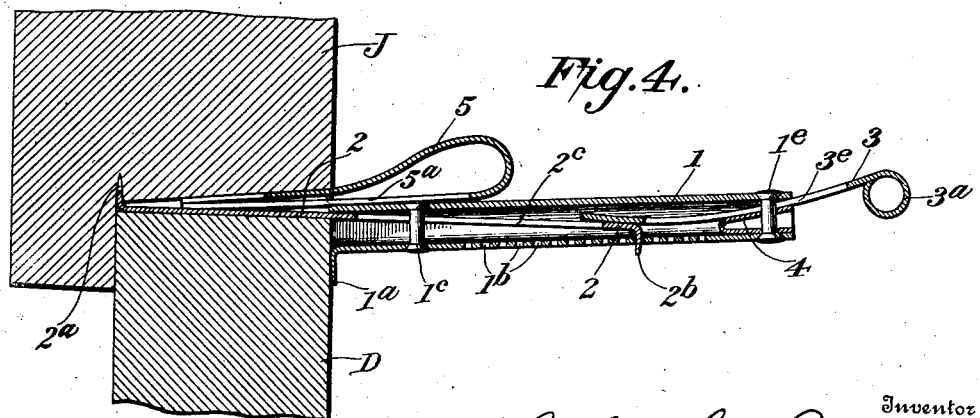

In said drawings—Figure 1 is a face view of the device folded. Fig. 2 is an edge view thereof. Fig. 3 is a longitudinal sectional view thereof on line 3—3, Fig. 1. Fig. 4 is a view of the device as arranged to secure a door or transom.

The device comprises a casing 1, which is preferably made of sheet steel, for the purpose of lightness and strength, and is about three inches in length and an inch in width. Said casing is open at both ends and has a short lip $1^a$ at one end projecting at right angles to the casing; and one of the sides of the casing is provided with a series of slots or notches $1^b$.

Telescoping with the casing is a fastener slide 2 which is longitudinally slotted as at $2^c$; through which slot passes a bolt or rivet $1^c$ attached to the casing so as to prevent entire disengagement of the slide from the casing while allowing the slide to be adjusted in the casing. On its outer end the slide 2 has a toothed flange $2^a$ projecting oppositely to the flange $1^a$; and on its inner end the slide 2 has a tooth $2^b$ adapted to engage with the slots or serrations $1^b$ in the casing so as to lock the slide thereto.

Entering the other end of the casing is a locking slide 3 having a slot $3^c$ transfixed by a pin $1^e$ attached to the casing so as to limit the movement of the slide 3 and prevent entire separation thereof from the casing; the outer end of slide 3 may be beaded or cut as at $3^a$ so as to manipulate handling thereof. The inner end of slide 3 is adapted to pass under the inner end of slide 2 and force the tooth $2^b$ outward and into engagement with one of the slots $1^b$, thereby locking slide 2 to the casing in adjusted position.

A spring 4 may be fastened within the casing and secured by the bolt $1^e$ as shown, said spring 4 pressing upon slide 3 and keeping it in position, and wherever adjusted.

A guard 5, consisting of a length of strap metal bent upon itself is provided, both for the purpose of preventing the teeth $2^a$ of the slide catching in anything when the device is folded for transport, (see Figs. 1, 2, 3), and also to serve the purpose of a wedge (see Fig. 4) to keep the fastener in proper position when applied to ill-fitting doors, as hereinafter explained. This guard has slots $5^a$ in its ends to enable the latter to be slid into the casing; the slots allowing the guard ends to move past the rivet $1^c$.

When the fastener is folded as shown in Figs. 1, 2 and 3, the guard covers the teeth $2^a$ and projects into the casing, and is not liable to become casually disengaged. But when the device is to be applied to the door the guard is removed, the locking slide 3 drawn out of the casing so as to release the teeth $2^a$ of the fastener slide 2 from the slots $1^b$; and slide 2 can then be drawn out.

The fastener slide 2 is then placed in the rabbet of the door-jamb J, and the door D is then closed thereupon forcing teeth $2^a$ into the wood of the jamb, as shown in Fig. 4. The casing 1 is then moved in until the flange $1^a$ rests against the edge of the door; then slide 3 is moved in and forces the toothed end $2^b$ of slide 2 into engagement with one of the slots $1^b$, thus locking the casing and fastener slide 2 securely together. When the parts are thus adjusted, as shown in Fig. 4, the door cannot be opened by reason of engagement of the toothed flange $2^a$ with the jamb, and of the flange $1^a$ with the door. If the door should be loose fitting, the guard 5 can be slid in as a wedge between the casing and door, as shown in Fig. 4, and will prevent the device being displaced by shaking the door. The guard 5 being virtually a spring, takes up all space between the door and jamb and holds the securer firmly against the door.

It will be seen that with the parts in the position shown in Fig. 4, the door will be securely fastened by the device.

To remove the fastener the locking slide 3 is drawn out and guard 5 removed; then the casing can be withdrawn from the door sufficiently to allow the latter to open whereupon the fastener slide 2 can be disengaged from the jamb. Then slide 2 can be telescoped into the casing; then slide 3 telescoped thereinto; and then the guard 5 can be placed, sidewise, over the toothed flange 2ª, and slid into the end of the casing, and the device is ready for transport.

Having described my invention what I claim as new and desire to secure by Letters Patent is:

1. In a securer, the combination of a slotted casing, with a fastening slide telescoping with the casing and having its outer end adapted to engage the door-jamb and its inner end adapted to engage the slots in the casing to lock the slide thereto, and means for holding the end of the slide in locked position in different slots.

2. In a securer the combination of a casing provided with a detaining flange, a fastener slide telescoping with the casing and having its inner end adapted to engage the casing, and its outer end adapted to engage the door-jamb, and a locking slide telescoping the opposite end of the casing, and adapted to hold the inner end of the fastener slide in engagement with the casing.

3. In a securer the combination of a slotted casing provided with a detaining flange, a fastening slide telescoping with the casing and having its inner end adapted to engage the slots in the casing, and having a toothed outer end adapted to engage the door-jamb, and means for locking the slide to the casing.

4. In a securer the combination of a slotted casing provided with a detaining flange, a fastening slide telescoping with the casing and having its inner end adapted to engage the slots in the side of the casing and having a toothed outer end adapted to engage the door-jamb; and a locking slide telescoping the opposite end of the casing and adapted to hold the inner end of the first slide in engagement with the casing slots.

5. A fastening device comprising a casing provided with slots in one side and with a door engaging flange on one end; a slotted fastener slide connected with the casing, and having a toothed inner end and adapted to engage the casing slides and having a toothed flange on its outer end adapted to engage the door-jamb, and a slotted locking slide telescoping the other end of the casing and adapted to hold the toothed end of the first slide in engagement with the slots, and a spring engaging the locking slide.

6. In a securer the combination of a casing having a door engaging device on one end, a slide telescoping the casing and having door-jamb engaging devices on its outer end, and means for locking the slide in adjusted position; with a detachable guard and wedge adapted to cover the outer end of said slide.

7. In a securer the combination of a slotted casing provided with a detaining flange, a fastening slide telescoping with the casing and having its inner end adapted to engage the slots in the casing, and having a toothed outer end adapted to engage the door-jamb; and means for locking the slide to the casing; with a bent spring guard adapted to be slipped over the toothed end of the fastening slide.

In testimony that I claim the foregoing as my own, I affix my signature in presence of two witnesses.

JOHN G. BINS.

Witnesses:
 E. S. ADKINS,
 F. C. MYERS.